June 17, 1924.

E. E. FERGUSON

VALVE

Filed March 2, 1923        2 Sheets-Sheet 1

1,498,367

Inventor
E. E. Ferguson
by Wilkinson & Giusta
Attorneys.

June 17, 1924. 1,498,367

E. E. FERGUSON

VALVE

Filed March 2, 1923 2 Sheets-Sheet 2

Inventor
E. E. Ferguson
by Wilkinson & Fisher
Attorneys

Patented June 17, 1924.

1,498,367

UNITED STATES PATENT OFFICE.

EDWARD ERASTUS FERGUSON, OF PORTSMOUTH, VIRGINIA, ASSIGNOR OF FORTY-NINE PER CENT TO C. VAN FLEMING, OF NORFOLK, VIRGINIA.

VALVE.

Application filed March 2, 1923. Serial No. 622,405.

*To all whom it may concern:*

Be it known that I, EDWARD E. FERGUSON, a citizen of the United States, residing at 103 Crawford St., Portsmouth, county of Norfolk, and State of Virginia, have invented certain new and useful Improvements in Valves, of which the following is a specification.

This invention relates to valves, and has for one of its objects to provide a valve which is particularly adapted for use in connection with fire hose as commonly employed in office and factory buildings, although it is also adapted for use with garden hose and in numerous other connections.

In large office and factory buildings it is at present customary to provide suitable lengths of hose which are to be used only in case of fire, which hose lengths are customarily positioned upon racks or reels at suitable points throughout the building, and which lengths of hose are also kept attached to permanent water pipes which are adapted to conduct water throughout the building. It is, however, customary to control the flow of water from the said pipes to the said hose by means of manually controlled gate or other valves which necessitate manual operation after the hose has been removed from its rack or reel, thereby resulting in either the loss of several minutes valuable time in case of fire or in the necessity of having at least two persons manipulate the hose, one to remove it from its rack and carry its nozzle to a point adjacent the fire, and the other to manipulate the valve. It frequently happens, however, that only one person is available, and it thus results that after he has carried the hose nozzle to a desired point he must of necessity return to the valve in order to open the same.

It is therefore the primary object of the present invention to provide a valve adapted to control the flow of water from the permanent water supply pipes to the flexible fire or other hose, which valve will automatically open to permit the flow of water when the hose is removed from its rack or reel.

A still further object of the invention is to provide a valve of the class described which will be simple in construction, comparatively inexpensive to manufacture and install and more efficient in use than those which have been heretofore proposed.

A still further object of the invention is to provide means whereby the valve may be normally positively maintained in position to cut off the flow of water from the permanent water supply to the hose, and when in this position to open communication to a suitable drain whereby any water which may be present in the hose will be automatically removed therefrom.

With the above and other objects in view, which will appear as the description proceeds, the invention consists in the novel details of construction and combinations of parts more fully hereinafter disclosed and particularly pointed out in the appended claims.

Referring to the accompanying drawings forming a part of this specification, in which like reference characters designate like parts in all the views.

Figure 1:
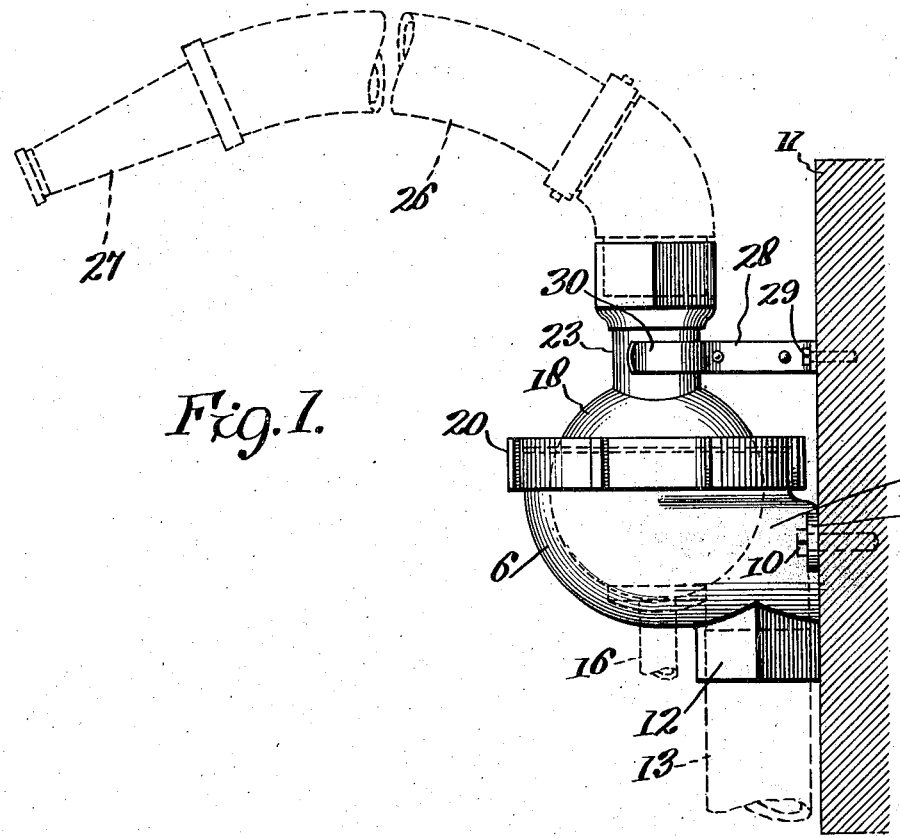
Figure 1 is a side elevational view of a valve made in accordance with the present invention, showing the same attached to a portion of a wall or other suitable support and connected to a permanent water supply pipe, as well as to a suitable fire or other hose.

Referring more particularly to the said drawings, the numeral 6 indicates the valve housing or casing which preferably takes the form of a substantially hemi-spherical hollow casting, which is provided with an extension 7, having a pair of ears 8, provided with suitable apertures 9, adapted to accommodate bolts or other suitable fastenings 10, whereby the valve may be secured to the wall or other support 11. The extension 7 is also provided with the downwardly extending boss or lug 12 which is threaded to receive the water supply pipe 13, as will be clear from Fig. 1.

Figure 4:
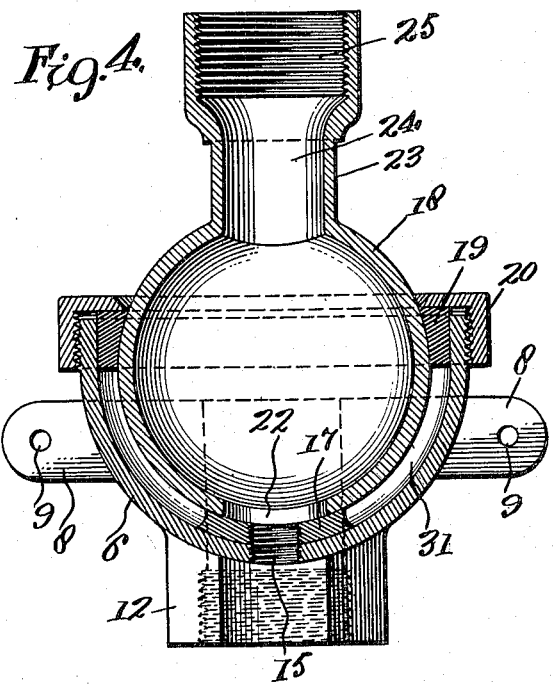
Fig. 4 is a central vertical sectional view of the valve taken approximately on the plane indicated by the line 4—4 of Fig. 5, looking in the direction of the arrows; and, Fig. 5 is a view similar to Fig. 4 and at right angles thereto, taken approximately on the plane indicated by the line 5—5 of Fig. 3, looking in the direction of the arrows.
Figure 5:
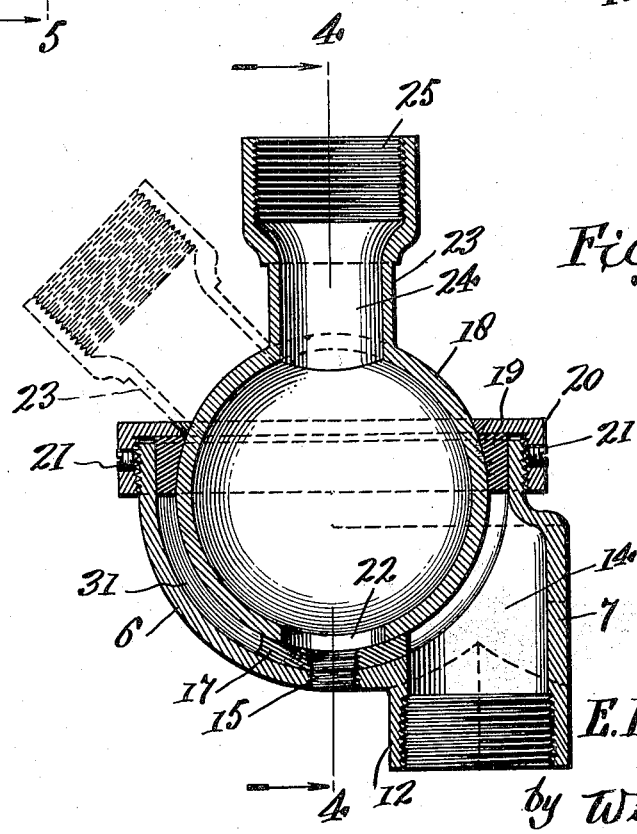

As above stated, the housing or casing 6 is hollow and the extension 7 is provided with a passage 14 communicating with the hollow interior of the said housing 6, as will be clear from Fig. 5, which passage 14 communicates with the said hollow interior at a point somewhat off of the median line. The said casing or housing 6 is provided on its said median line with a threaded hole 15, which is adapted to receive the end of a suitable drain pipe 16, see Fig. 1, and the interior surface of the said casing or housing may be provided with a boss 17, through which the said threaded hole or aperture extends, as will be clear from Figs. 4 and 5.

Figure 3:
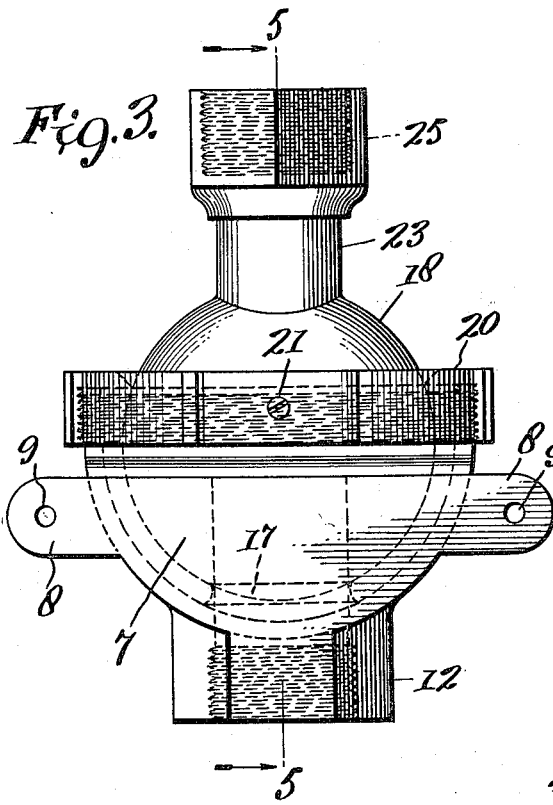
Fig. 3 is a rear elevational view on a somewhat enlarged scale of the valve shown in Figs. 1 and 2.

Within the said hollow casing 6 there is mounted the substantially spherical hollow valve member 18, the outer surface of which is preferably finished to provide a free sliding fit with the surface of the boss 17 and with a suitable packing ring 19, which is held in position as indicated in Figs. 4 and 5, by the threaded cap member 20, which engages the upper portion of the hemi-spherical shell 6, as will be readily apparent. The said cap member 20 may be maintained in its adjusted position by means of set screws 21, see Figs. 3 and 5, and any wear of the packing ring 19 may be compensated for from time to time by adjustment of the cap 20, as will be readily understood.

The hollow spherical member 18 is provided with an opening or port 22, which in the closed position of the valve is adapted to register with the threaded passage 15 and drain pipe 16, whereby any water within the said spherical member 18 or the hose which is connected thereto, may be drained therefrom. The said member 18 is also provided at a point substantially diametrically opposite to the port 22 with an extension 23 having the outlet port or passage 24 and threaded as indicated at 25 for connection with one end of any suitable hose 26, which may be provided within a suitable nozzle 27, see Fig. 1.

Figure 2:
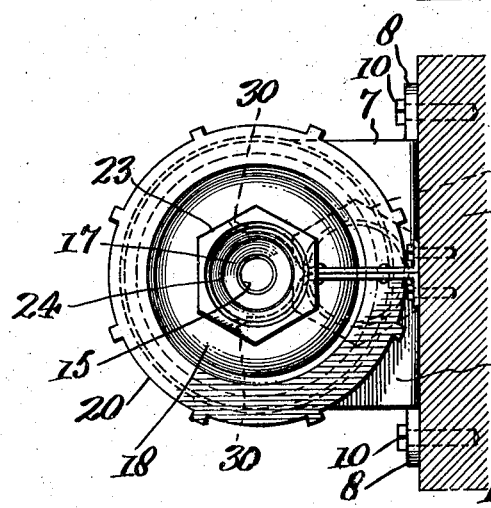
Fig. 2 is a top plan view of the valve shown in Fig. 1.

A suitable guide or retaining member 28 of resilient material is secured to the wall 11 as by the securing means 29 and is provided with a bifurcated end 30 which is adapted to receive and embrace the neck or extension 23 of the spherical valve member 18, as will be clear from Figs. 1 and 2. The resilient member 28 is so designed, constructed and assembled in relation to the valve that when the neck or extension 23 is in position within the bifurcated end 30, the port 22 will always be in register with the drain opening 15 and drain pipe 16, while the flow of the water from the pipe 13 to the hose 26 will be cut off, as will presently appear.

The rack or reel for the hose 26 has not been illustrated in the drawing, inasmuch as it constitutes no part of the present invention, but it will be understood that the said hose is normally positioned upon some support of that character.

When it is desired to use the hose either for extinguishing a fire, or for sprinkling purposes in the case of a garden hose, it is only necessary to grasp the said hose and to pull it from its rack or reel until its full length has been removed therefrom. This pull upon the hose will then be transmitted to the neck portion 23 of the spherical valve member 18 and the latter will be rotated within the housing 6 to move the port 22 out of register with the drain opening 15 and out of engagement with the boss 17. The port 22 is thus moved to communication with the hollow space 31, existing between the interior surface of the housing 6 and the interior surface of the vertical member 18, which space being in communication with the passage 14 and supply pipe 13 is constantly filled with water. As soon as such communication is established, the water will of course flow through the port or opening 22, filling the interior of the spherical member 18 and then passing through the passage 24 to and through the hose 26 and nozzle 27, by which latter means it can be directed to any desired point.

It will be noted that communication between the port 22 and the space 31 may be established by moving the ball or spherical member 18 in any direction, inasmuch as just as soon as the port 22 clears the edge of the boss 17 it is in direct communication with the source of water supply. Furthermore, due to the resilience of the retaining or guiding member 28, the said member 18 may be moved under the influence of the pull on the hose in substantially any direction, thus making it possible to secure the flow of water immediately, regardless of the direction in which the hose is pulled. Furthermore, due to the fact that the water constantly fills the hollow space 31, a pressure will be constantly exerted upon the spherical member 18, which will always tend to maintain a tight joint between the surface of the said spherical member and the packing ring 19.

It will thus be seen that the present invention provides an automatically operable valve which is especially adapted for use in connection with fire hose, garden hose, and the like, and which may position itself to permit a flow of water through the said hose as soon as the latter is removed from its rack or other normal support.

While one form of the invention has been illustrated and described, it is obvious that those skilled in the art may vary the details of construction as well as the arrangement of parts without departing from the spirit of the invention, and therefore it is not wished to be limited to the above disclosure except as may be required by the accompanying claims.

What is claimed is:

1. A valve of the class described comprising a casing provided with an inlet port and a boss having a drain opening; and a valve member mounted within said casing, and engaging said boss whereby it is maintained in spaced relation to the walls of said casing, said member being provided with a port which in the closed position of the valve registers with said boss and drain opening, said valve member being movable in substantially all directions to move said port out of register with said boss and opening and into communication with said casing port.

2. A valve of the class described comprising a hollow casing provided with an inlet port and a boss; and a valve member mounted within said casing and engaging said boss whereby it is maintained in spaced relation to the walls of said casing, said member being provided with a port which in the closed position of the valve registers with said boss, said member being movable in substantially all directions to move its port out of register with said boss, and into communication with the space between said casing and valve member walls.

3. A valve of the class described comprising a hollow substantially hemi-spherical casing provided with an inlet port and a boss; and a substantially spherical valve member mounted within said casing and engaging said boss whereby it is maintained in spaced relation to the walls of said casing, said inlet port communicating with said space, said member being provided with a port which in the closed position of the valve registers with said boss, said member being movable in substantially all directions to move its port out of register with said boss, and into communication with the space between said casing and valve member walls.

4. A valve of the class described comprising a hollow substantially hemi-spherical casing provided with an inlet port and a boss; a substantially spherical valve member mounted within said casing and engaging said boss whereby it is maintained in spaced relation to the walls of said casing, said inlet port communicating with said space, said member being provided with a port which in the closed position of the valve registers with said boss, said member being movable in substantially all directions to move its port out of register with said boss and into communication with said space; and means including packing and retaining members for maintaining said valve member in operative position in said casing.

5. A valve of the class described comprising a hollow substantially hemi-spherical casing providing a valve chamber, said member having an inlet port and a boss provided with a drain opening; a hollow substantially spherical valve member mounted within said valve chamber with its outer surface engaging said boss whereby it is maintained in spaced relation to the walls of said casing, said inlet port communicating with said space, said member being provided with a port adapted in the closed position of the valve to register with said boss and drain opening, said member being movable in substantially all directions to move its port out of register with said boss and opening, and into communication with said space; and means for yieldingly maintaining said valve in its closed position.

EDWARD ERASTUS FERGUSON.